US011758020B1

(12) United States Patent
Tijerina et al.

(10) Patent No.: US 11,758,020 B1
(45) Date of Patent: Sep. 12, 2023

(54) SELECTIVE MESSAGING FOR REDUCING SERVER LOAD

(71) Applicant: UIPCO, LLC, San Antonio, TX (US)

(72) Inventors: Oscar Roberto Tijerina, San Antonio, TX (US); Noe Alberto Martinez, San Antonio, TX (US); Huihui Wu, Grapevine, TX (US); Steven Michael Bernstein, San Antonio, TX (US); Nickolaus Wayne O'Neal, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/693,733

(22) Filed: Mar. 14, 2022

(51) Int. Cl.
*H04L 67/63* (2022.01)
*G06F 9/50* (2006.01)
*H04L 67/55* (2022.01)
*G06F 9/48* (2006.01)
*G06Q 30/0601* (2023.01)

(52) U.S. Cl.
CPC .............. *H04L 67/63* (2022.05); *G06F 9/485* (2013.01); *G06F 9/505* (2013.01); *H04L 67/55* (2022.05); *G06F 2209/503* (2013.01); *G06Q 30/0601* (2013.01)

(58) Field of Classification Search
CPC ........................... G06Q 40/00; G06Q 30/0601
See application file for complete search history.

(56) References Cited

U.S. PATENT DOCUMENTS

| | | | |
|---|---|---|---|
| 6,871,415 B2* | 3/2005 | Wendt ...................... | G01B 3/46 33/522 |
| 7,257,812 B1* | 8/2007 | Calder .................... | G06F 9/485 718/100 |
| 2006/0069763 A1* | 3/2006 | Kido ................... | H04L 67/1001 709/223 |
| 2013/0185198 A1* | 7/2013 | Lorch ................ | G06Q 30/0601 705/39 |
| 2014/0365322 A1* | 12/2014 | Phillips .................. | G06Q 40/00 705/16 |

* cited by examiner

*Primary Examiner* — Barbara B Anyan
(74) *Attorney, Agent, or Firm* — Potomac Law Group, PLLC

(57) ABSTRACT

Implementations selectively message member account data to client applications to reduce server load. When a monitored load on cloud servers meets a criteria, a hold status may be triggered. During the hold status, member accounts may be monitored and client applications may be transmitted push messages, for example when a change is detected in a member's monitored account. The push messages can contain the detected changes, such as a posted transaction that triggered the message. Implementations of the client application can be configured to display local data (stored from the push messages) during the hold status in response to a member's request to access/view their account. Because server to client communication is limited to messages that contain member account changes, an overall server load can be reduced.

20 Claims, 10 Drawing Sheets

SELECTIVE MESSAGING FOR REDUCING SERVER LOAD

TECHNICAL FIELD

The present disclosure is directed to reducing server load through selective messaging.

BACKGROUND

Modern software applications provide users on-demand access to application data. However, trends in user access requests can create uneven demands on the computing devices that provide the on-demand access. For example, at peak demand, server load can be considerably higher than average. Uneven server load that peaks at high values can overburden an organization's computing infrastructure and cause inefficient resource allocation. Reducing load on an organization's cloud system can improve resource utilization and ease peak load to improve performance.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
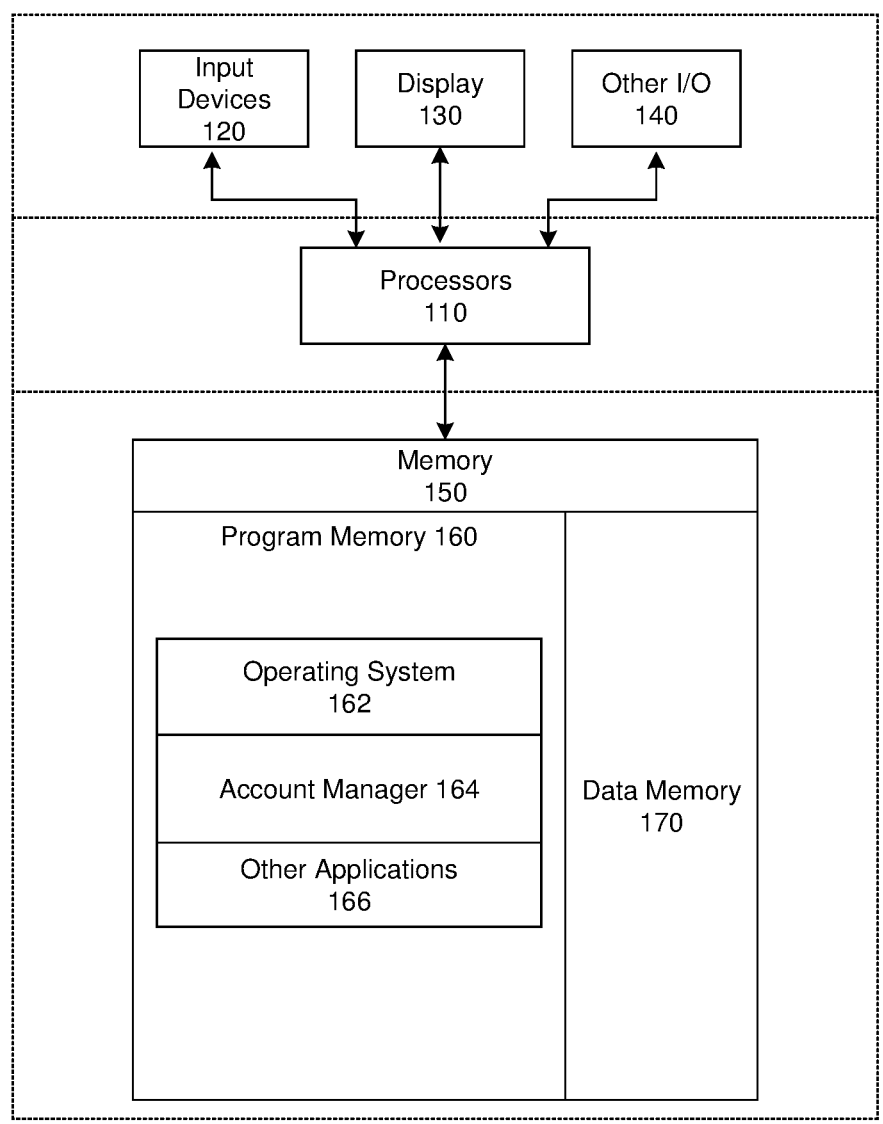
FIG. 1 is a block diagram illustrating an overview of devices on which some implementations can operate.

Aspects of the present disclosure are directed to selective messaging for reducing server load. For example, an organization may have members (e.g., registered users) that possess accounts. These members may access their accounts using client devices (e.g., mobile phone, laptop, or any other suitable computing device). In some implementations, the member account can be a bank account (e.g., checking, saving, investment, and the like) with a balance such that posted transactions change the balance value over time. Member access interactions may involve checking an account status, reviewing changes to the account, retrieving an account balance, and other suitable account activity.

Implementations selectively message member account data to client applications (e.g., running on member devices). For example, when a monitored load on cloud servers that manage account access meets a criteria, a hold status may be triggered (e.g., hold on outbound request from the client applications to the cloud servers). During the hold status, member accounts may be monitored and client applications may be transmitted push messages, for example when a change is detected in a member's monitored account. The push messages can contain the detected changes (e.g., a posted transaction that triggered the message). Implementations of the client application can be configured to display local data (e.g., stored from the push messages) during the hold status in response to a member's request to access/view their account. Because server to client communication is limited to messages that contain member account changes, an overall server load can be reduced as requests from users for accounts that have not changed can be handled with local data which doesn't incur network or server resources.

Implementations can push messages to client applications during a hold status based on update parameters. For example, update parameters can be defined for a member account, such as a minimum delta value (e.g., minimum change in account value—which may include any change in account value), transaction type, minimum delta value for particular transaction types, active time periods (e.g., times of day for days of the week), or a combination of these. A detected change to a member account can be compared against the update parameters defined for the member account. When the detected change matches an update parameter, an update message may be transmitted with the change (e.g., posted transaction that triggered the message). For example, a first account value change that does not meet the minimum delta value defined in the account's update parameters may not trigger an update message, while a second account value change that exceeds the minimum delta value may trigger an update message that contains the delta value.

Implementations continue pushing updates and pausing data requests from clients until a load on the server falls below a criteria, when the hold status expires (e.g., due to a set expiration time), or for any other suitable hold revocation or expiration. For example, a message revoking the hold status can be pushed to client applications when the server load falls below the criteria. In another example, the hold status message that initiates the hold may contain and expiration time. When the hold status is revoked or expires, cloud servers can return to receiving client application data requests and providing member account data in reply messages. In some implementations, instead of managing and communicating hold statuses, client devices can always use a local data store to respond to account access requests, and that local data store can be continuously updated from the server system as the user's update parameters are satisfied.

Implementations can also push alert messages from a cloud server to member applications/member devices using alert preferences. A member's account can be monitored for posted transactions, changes to account balances, and other member data changes. Changes for a member account can be detected based on the monitoring. Implementations compare monitored account changes to alert preferences for the member account. Example alert preference definitions include a change in account balance above a threshold, an account transaction including an entity that matches a predetermined entity identifier, a transaction in a certain timeframe, etc. For example, when a posted transaction causes a delta change to a member's account that triggers an alert preference, an alert message can be pushed to the client application that includes the delta change (e.g., posted transaction, account balance, etc.)

Implementations can also provide a text message service for registered member accounts. The text message service can provide a member's client device account data in response to predetermined trigger messages. For example, a text message (or other communication) received from a client device (e.g., from a number registered with a member account, or sent via a mobile app or website to which the user has authenticated) may include the content "#lastdeposit" or another command to send a responding text message with particular data. The content can be compared to definitions for the predetermined trigger messages. In this example, "#lastdeposit" may be the trigger message for retrieving the member account's latest deposit transaction. The latest deposit transaction may be retrieved and a text message reply with this transaction can be generated and sent to the client device (e.g., via a phone number registered in the member's profile or as a response to the originating text message).

Conventional account servicing systems suffer from inefficient cloud computing resource utilization. In particular, when these systems are impacted by uneven load, the conventional approach is to dynamically scale up cloud resources. However, this scaling solution can occupy large quantities of cloud resources at peak load, and little to no mitigation techniques are utilized to reduce the traffic/requests received at the cloud system. Accordingly, conventional systems merely increase compute to process load and fail to implement techniques to actually reduce load at peak.

Implementations described herein use a local data store on client devices (which may be managed in response to a hold status) to reduce load on a cloud computing system and more effectively utilize cloud server and network resources. In particular, update messages are transmitted to client applications based on changes to monitored accounts, and these update message enable the client applications to display an account status using locally stored data. Because update message are transmitted according to update parameters, the message transmission are selective (e.g., occur when a change is detected) yet client applications are provided with the messages necessary to support the local display of account data.

The hold status and resultant pause on client application requests also achieves reduced load at peak, which supports a more even load on cloud devices and higher computing efficiencies. Some implementations also configure update messages based on member access activity. For example, machine learning models can learn trends and/or predict which transactions prompt member activity, and update messages can be sent in anticipation of member activity. This results in a higher degree of member satisfaction and ensures that the cloud resource spend on transmitting an update message provides member value. Some implementations also permit a member to view account activity, such as transactions, based on pushed alerts or through a text message exchange. These additional options provide members a channel to access account data that uses fewer cloud resources than the conventional techniques for account access (e.g., client application or website login).

Several implementations are discussed below in more detail in reference to the figures. FIG. 1 is a block diagram illustrating an overview of devices on which some implementations of the disclosed technology can operate. The devices can comprise hardware components of a device 100 that reduce server load using selective messaging. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, account manager 164, and other application programs 166. Memory 150 can also include data memory 170, e.g., account data, messaging preferences, local account data, account access logs, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
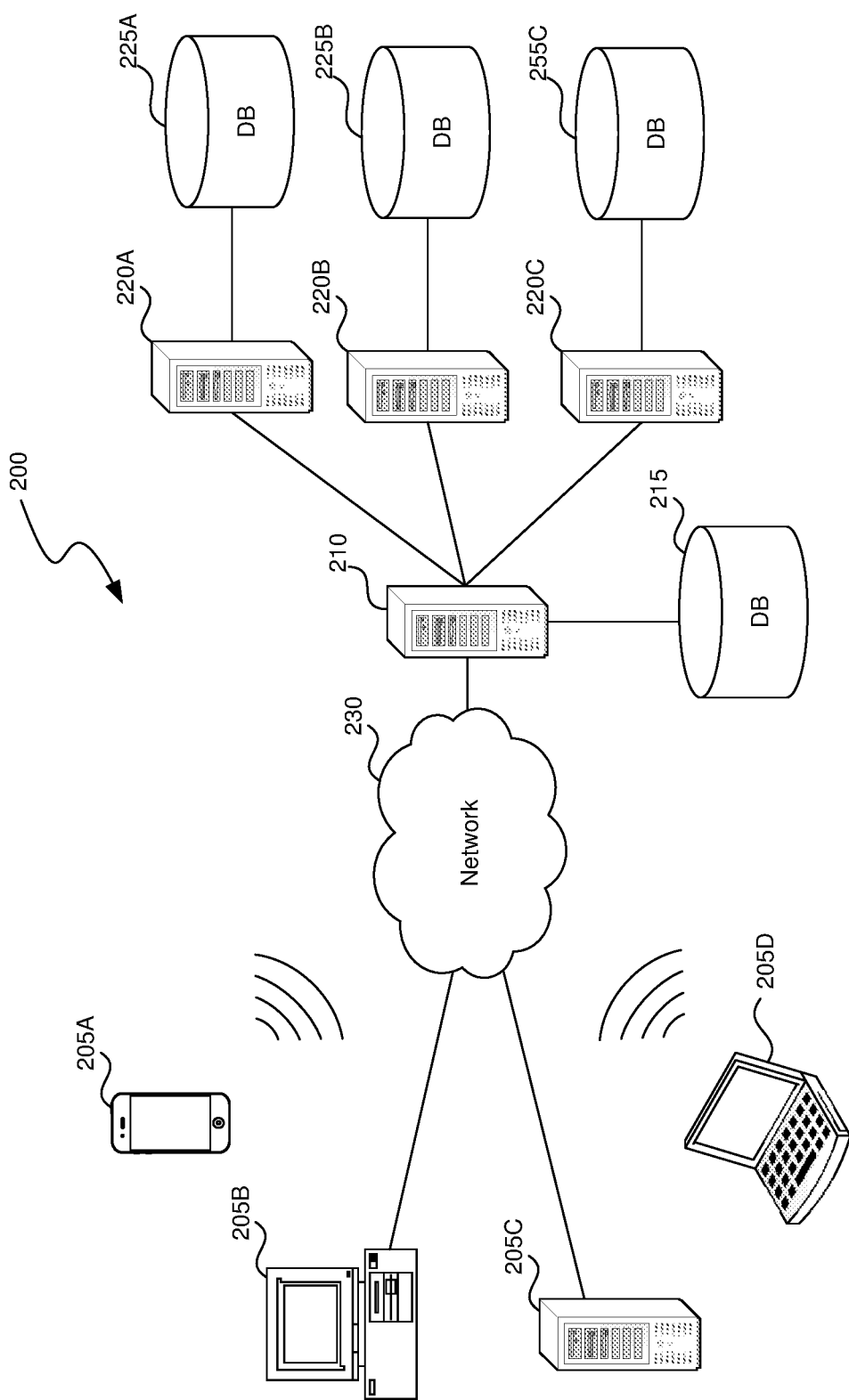
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as account data, messaging preferences, local account data, account access logs, configuration data, settings, user options or preferences, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
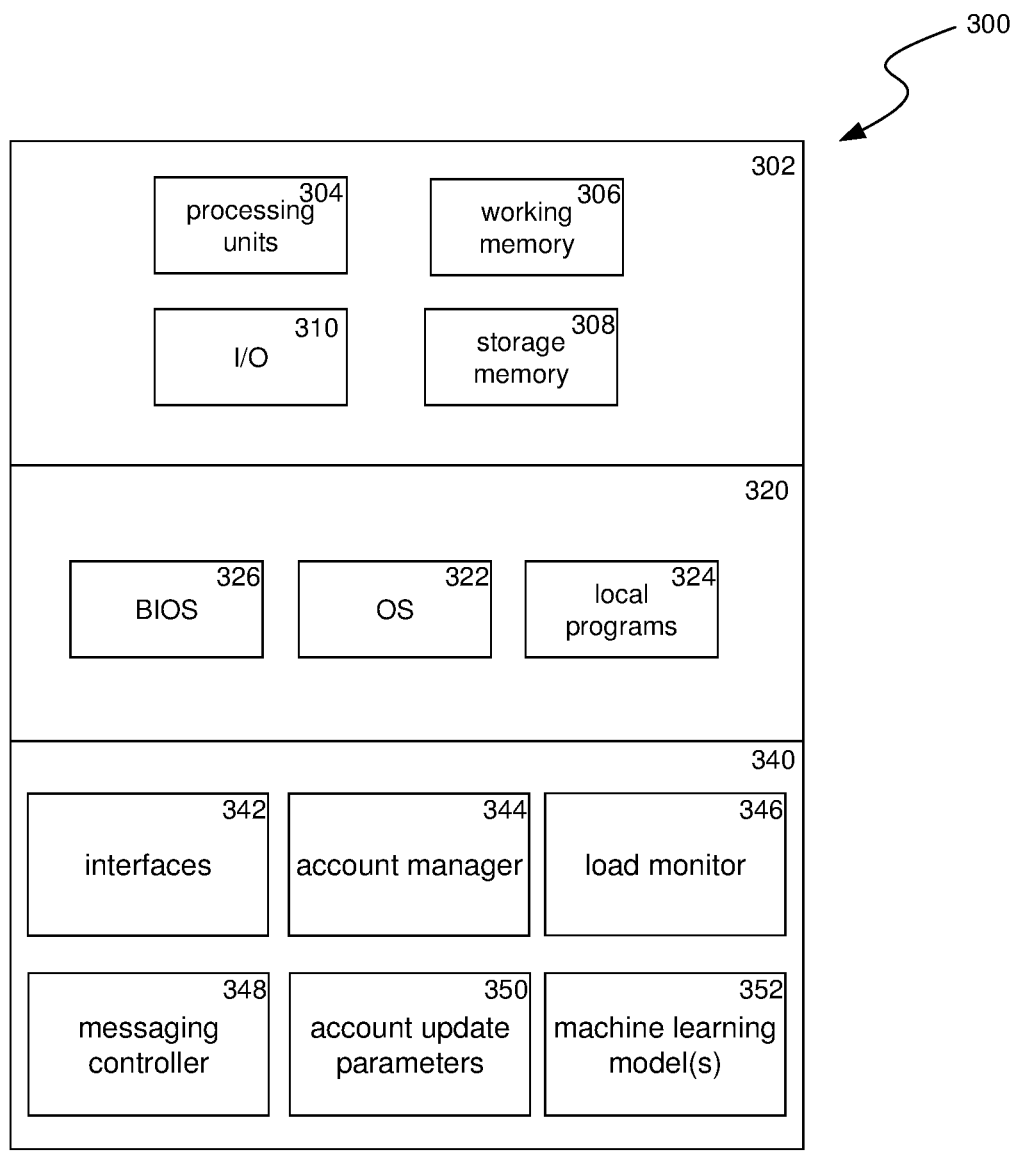
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include account manager 344, load monitor 346, messaging controller 348, account update parameters 350, machine learning model(s) 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Account manager 344 monitors member accounts and manages parameters and preferences for communication with the member accounts. For example, account update parameters 350 may define parameters for transmitting member account updates, such as during a hold status. In another example, member alert preferences may define when an alert should be transmitted to a member's client application or client device (e.g., registered client device). Update parameters 350 and/or alert preferences may be defined by (or for) a member using one or more user interfaces (e.g., web application, client application, etc.), and account manager 344 may manage these interactions and implement storage of these definitions.

Account manager 344 can also register member client applications/devices for account updates and/or text message service. Updates, push messages alerts, and other communication can be transmitted to the client application/client device registered with the member account. Registration may include an authentication flow, such as two-factor authentication, three-factor authentication, username and password confirmation, authentication using one or more authentication devices (e.g., located at an automated teller machine associated with the member organization), or any other suitable authentication. In some implementations, the client device is a mobile device and registering the mobile device includes registering a phone number.

Account manager 344 can monitor member accounts for changes. For example, a member account can be a bank account (e.g., checking, saving, investment, and the like) with a balance such that transactions change the balance value over time. Account manager 344 can monitor the account balance, transactions, transaction details (e.g., entity, transaction type, category, etc.), and other suitable account activity. Changes for a member account can be detected based on the monitoring. Account manager 344 can compare these detected changes to update parameters 350 and/or alert preferences. When a detected change matches an update parameter and/or alert preference, account manager 344 can instruct messaging controller 348 to transmit the relevant message (e.g., client application message, push message, alert message, text message, and the like).

Load monitor 346 monitors the load on cloud devices and/or network bandwidth that implement responses to member account requests. For example, requests from client applications/devices can be processed by one or more cloud servers or other cloud devices (e.g., load balancers, traffic routers, cache nodes, and the like). Load monitor 346 can monitor the load on these cloud devices and associated devices/services. In some implementations, when the monitored load reaches a first load criteria, one or more cloud devices can be scaled up to meet the increased load. When the monitored load reaches a second criteria (e.g., maximum number of cloud devices already scaled and monitored load meets a criteria), a hold status can be implemented for client devices/applications.

For example, the hold status may alter the functionality of the cloud servers such that update messages are generated and pushed to client applications after account changes are detected. Because messages are generated and pushed in response to detected account changes, an overall load on the cloud devices may be reduced (e.g., when users would otherwise make a second request for account information that has not changed since the user's last similar request). When the monitored load falls to a third load criteria (or the hold status expires) the functionality of the cloud devices can return to processing requests from client applications/devices. In some implementations, load monitor is not implemented and all user account requests are handled with local information that is updated with data pushed to the local data store by the cloud system.

Messaging controller 348 can generate and implement transmission of messages to client applications and/or client devices. An example message includes a client application message that stores member account changes (e.g., a posted transaction). In this example, during a hold status, the client application can be configured to locally store the account changes and display account data using the locally stored data. In another example, messaging controller 348 can transmit push messages, message alerts, text messages (e.g., Short Message Service ("SMS") message), or any other message in any suitable message format.

Implementations of messaging controller 348 can implement a text message service for member accounts (e.g., member accounts registered for text message service). The text message service can provide member account data in response to predetermined trigger messages. For example, a message received from a client device (e.g., registered with a member account) may be a text message that includes the content "#balance" or a message initiated by a mobile device app or website into which the user has been authenticated can include a command to text the user certain account status info. The content can be compared to definitions for the predetermined trigger messages. In this example, the "#balance" content may be the trigger message for retrieving the member account's current balance. The account balance may be retrieved and messaging controller 348 may generate a text message reply with the account balance.

The text message service may reduce a load on cloud devices because overhead associated with authentication and security (e.g., logins, multi-factor authentication, other security parameters) can be reduced. The implementation can rely on previous device registration to ensure the communication is transmitted to the proper client device. Moreover, some implementations provide access to limited data through the text message service, and thus a full-scale authentication may not be necessary.

Account update parameters 350 store update parameters and/or alert preferences for member accounts. For example, update parameters can define when and how update messages are sent to a member's client application during a hold status. Example update parameters include a minimum delta value (e.g., minimum change in account value—which herein may be zero, signifying an update upon any change), transaction type, minimum delta value for particular transaction types, active time periods (e.g., times of day for days of the week), or a combination of these. A detected change to a member account can be compared against the update parameters defined for the member account. When the detected change matches an update parameter, a message may be transmitted to the member's client application with the change data. The client application can be configured to store the change data in the message. During a hold status, locally stored data can be displayed in response to a member request to view account data.

In another example, a detected change to a member account can be compared against the alert preferences defined for the member account. When the detected change matches an alert preference, an alert message maybe transmitted to the member's registered client application/device. Example alert preferences include a minimum delta value (e.g., minimum change in account value), transaction type, minimum delta value for particular transaction types, time periods for alerts (e.g., times of day for days of the week), or a combination of these. The transmitted alert can be displayed at the client application/device in any suitable display manner (e.g., as an SMS message, push message, client application alert, etc.).

Implementations compare transactions to update parameters and/or alert preferences, and the transactions can include transaction details. For example, a transaction can have a transaction type (e.g., deposit, withdrawal, etc.), entity (e.g., company/individual associated with the transaction), category (e.g., direct deposit, debit card, credit card, transfer, etc.), description, other contextual data (e.g., image of a check), and other suitable transaction detail. Similarly, update parameter definitions and alert preference definitions can include data values, operators, and/or criteria to match transaction details. Accordingly, posted transactions can be compared to update parameters and/or alert preferences in order to trigger update messages and/or alert messages.

Machine learning model(s) 352 can be any machine learning model suitable for analyzing account data to detect/predict access trends, such as models that can derive access trends from account access log data. In some implementations, machine learning model(s) 352 can be configured to digest log data that represents a member's activity when accessing a member account. The log data can include online and/or client application login data, navigation data, viewing data, viewed/accessed transactions data (e.g., transaction type, transaction entity, change in account balance, etc.), and any other suitable log data. The log entries for this data can also include context, such as a timestamp (e.g., time and date), identifier for cloud device/system processing the client requests, and other suitable context.

In some implementations, machine learning model(s) 352 are configured to analyze access log data in combination with transactions data for a member's account. In this example, trends that associate posted transactions to member access activity can be detected. Based on these trends, update parameter recommendations, alert preferences recommendations, and/or a text service registration recommendation can be generated. For example, a trend that indicates a member activity proximate to a recurring account transaction (e.g., direct deposit of paycheck) can indicate the member's interest in the paycheck deposit status. In this example, a recommendation can be generated that recommends an update parameter and/or alert preference definition that meets the characteristics of the direct deposit transaction (e.g., transaction type, transaction among, entity performing the transaction, date or date range, and the like). In another example, a member may have less consistent transactions that change the account balance, however trends in the access log data can indicate that the member has activity proximate to any transaction that causes an account balance change over a threshold. In this example, a recommendation can be generated that recommends an update parameter and/or alert preference definition that meets the characteristics of these transactions (e.g., transaction type, transaction delta amount, and the like).

Machine learning model(s) 352 can be supervised learning models, unsupervised learning models, or other models that can analyze account access data and/or transaction data to detect trends and/or make predictions. In some implementations, machine learning model(s) 352 can be used to generate update parameter recommendations, alert preferences recommendations, and/or a text service registration recommendation, and these recommendations can be provided to the member.

Implementations can also automatically transmit account updates to a member's client application during a hold status based on predicted member access activity. For example, trained/configured machine learning model(s) 352 can receive as input transaction(s) posted to a member account. The posted transaction(s) can be one or more bank transactions that reduce or increase the member's account balance. Based on features for the posted transaction(s) (e.g., time of day, type of transaction, entity, delta to balance, etc.), machine learning model(s) 352 can predict a likelihood of a member access activity. When machine learning model(s) 352 predicts member access activity is likely (e.g., a prediction with a confidence above a criteria) an update that contains the posted transaction(s) (e.g., a change caused by the posted transaction(s)) can be transmitted to the member's client application. The client application can then locally store account data that reflects the posted transaction(s). When the member requests to view the account data, locally stored data can be used to service the request.

A "machine learning model," as used herein, refers to a construct that is trained or configured using training data or a corpus of data to make predictions or provide probabilities for data items (e.g., whether or not the data items were included in the training data/corpus of data). For example, training data for supervised learning can include items with various parameters and an assigned classification or prediction value. A new data item can have parameters that a model can use to assign a classification to the new data item or predict a value. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive transaction data. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce value(s) based on the input that, once the model is trained, can be used to predict member access activity based on transaction data. In some implementations, such neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

A machine learning model can be trained with supervised learning, where the training data includes transactions data as input and a desired output, such as labels from member access log data. A representation of transactions data can be provided to the model. Output from the model can be compared to the desired output for that input (e.g., labels) and, based on the comparison, the model can be modified, such as by changing weights between nodes of the neural network or parameters of the functions used at each node in the neural network (e.g., applying a loss function). After applying the examples in the training data and modifying the model in this manner, the model can be trained to predict member access activity based on transactions. The transaction data and member access log data can be associated with a given member and member account or can be a combination of transaction data and member access log data for several members and member accounts.

Figure 4:
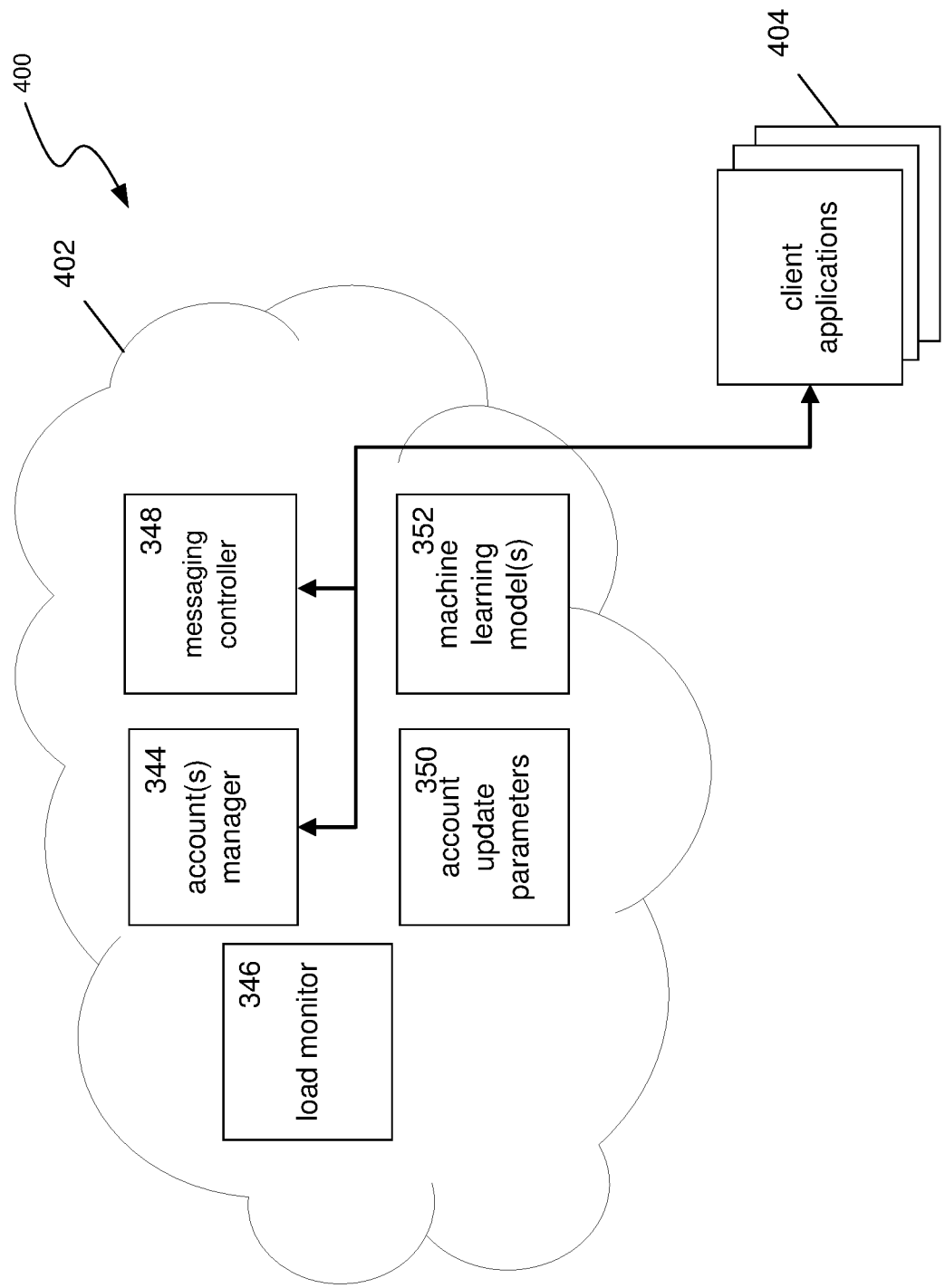
FIG. 4 is a system diagram illustrating components for reducing server load with selective messaging.

Implementations configure interactions between a cloud system (e.g., cloud devices) and client applications (e.g., client devices) to reduce load on the cloud system by selectively transmitting messages to the client applications based on monitored changes to member accounts. FIG. 4 is a system diagram illustrating components for reducing server load with selective messaging. System 400 includes cloud 402 and client applications 404. Cloud 402 can implement account manager 344, load monitor 346, messaging controller 348, account update parameters 350, and machine learning model(s) 352 of FIG. 3.

Client applications 404 can be loaded/running on client devices, such as a smartphone, laptop, tablet, or any other suitable computing device. A client application and client device can be associated with a given member and member account. For example, the member (e.g., user) can interact with the client device and client application to access a member account managed at cloud 404. Account(s) manager 344 and messaging controller 348 can communicate with client applications 404. For example, communication between account(s) manger 344 and client applications 404 can be used to: a) register client devices; b) register for services (e.g., text message services); c) define update parameters and/or alert preferences; d) process client applications requests for account data; and (e) implement other cloud services for client applications 404.

Messaging controller 348 can transmit messages to and receive messages from client applications 404 (or their associated client devices). The messaging format can be any of client application messages (e.g., formatted according to the client application), SMS messages, push messages, alert messages, a combination thereof, or any other suitable messaging format. In an example, during a hold status messaging controller 348 can transmit a hold message to client applications 404 and one or more update messages to update locally stored member account data at client applications 404. In another example, messaging controller 348 can transmit alert messages to client applications 404.

Implementations of machine learning model(s) 352, account update parameters 350, and load monitor 346 at cloud 402 can be used to initiate and administer a hold status for client applications 404. For example, load monitor 346 can monitor a load at cloud 402. The load can be compared to a criteria, such as comparing a processor utilization for one or more cloud devices (or virtual machines) to a load criteria. When the monitored load meets the load criteria, a hold status can be triggered for communication between cloud 402 and client applications 404. Any other suitable load metric and/or criteria can be implemented.

During a hold status, cloud 402 may transmit update messages to client applications 404 based on changes detected for the member accounts associated with the client applications. For example, account(s) manager 344 can monitor the member accounts and detect changes. The changes can be compared to the definitions stored by account update parameters 350, and update messages can be transmitted (e.g., by messaging controller 348) for changes that match the stored definitions. Implementations can store different update parameters for different member accounts based on input from the members that own the accounts and/or account access patterns for the members.

Client applications 404 can be configured to pause outbound requests for account data when a hold status message is received. For example, the hold duration can be a predetermined amount of time, an amount of time defined in the hold status message (e.g., based on an expiration time), until a revocation message is received, a combination thereof, or any other suitable duration. Client applications 404 can include a user interface that a member interacts with to access account data, make changes to the member's account, and perform other actions. During normal operation, client applications 404 may issue requests to cloud 402 in response to member requests for account data and display the returned data. During a hold status, client applications 404 may display locally stored data in response to these member requests. Because update messages are received from cloud 402 during the hold status, the locally stored data can reflect almost up-to-date account data. Further, update messages are sent according to detected changes that are likely of interest to the members, and thus the locally stored data reflects the most likely data a member would like to view.

In some implementations, an indicator may be displayed that indicates a timestamp for locally stored data and/or users may be notified that the account data being displayed may be out of date or is scheduled to be updated. For example, cloud 402 may transmit an update message to one of the client applications 404 at a first time (e.g., based on a detected change to a member account), and the member account data displayed by one of client applications 404 can indicate the first time. This indicator can reflect that the member account data being displayed is accurate up to the first time.

In some implementations, during a hold status a member may initiate a manual pull of account data. For example, during normal operation client applications 404 may request account data from cloud 402 after a member login, and the returned account data can be displayed. During the hold status, this account data displayed to the member at login can be the locally stored data. The member may then select the account and manually initiate a request for a pull down of the most recent member account data. In this example, data requests are only sent from client applications 404 when a member explicitly indicates a desire for the most up-to-date account data. Because it is likely that not every member initiates such a manual pull down, load at cloud server 402 is likely to be reduced during a hold status.

Figure 5A:
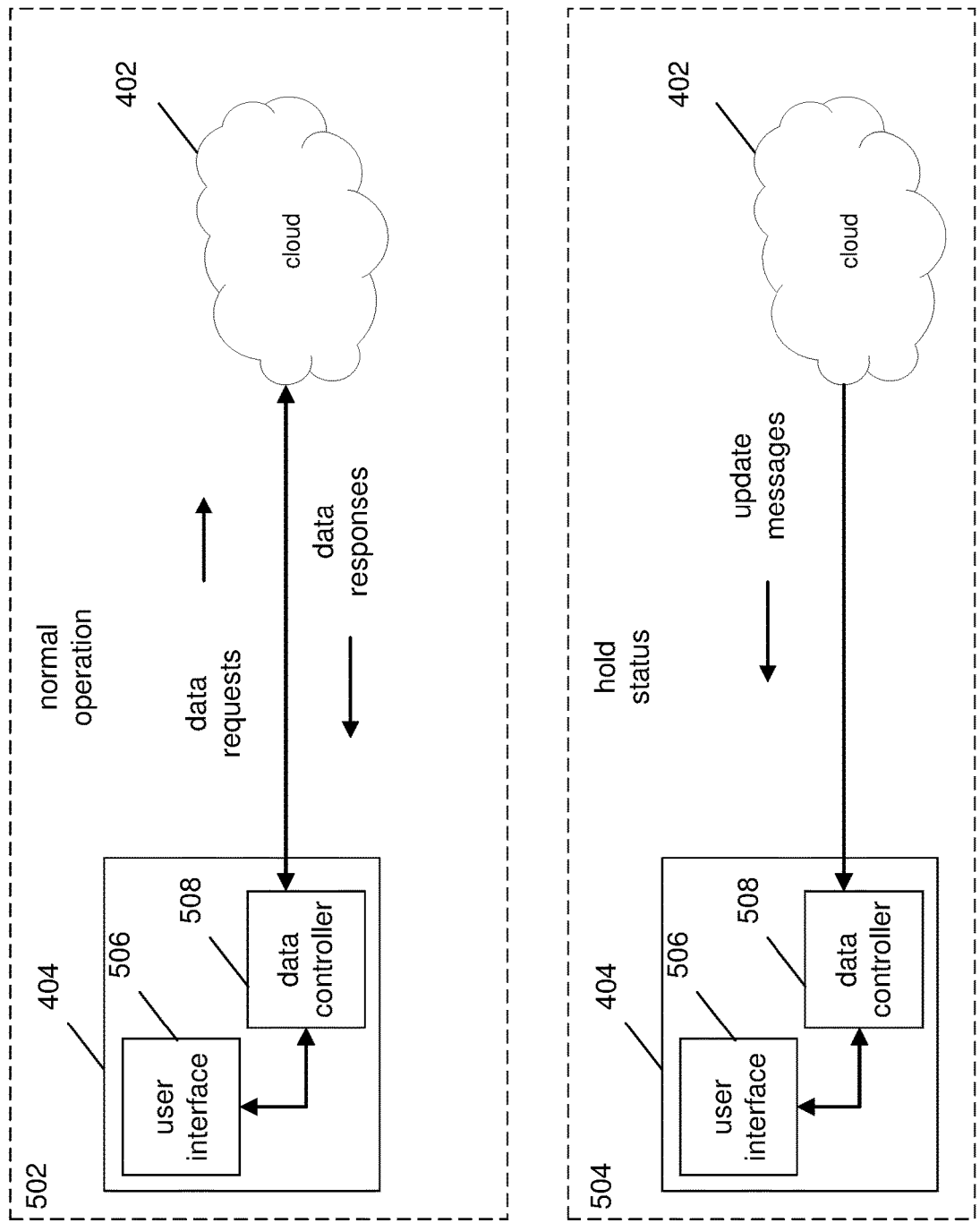
FIGS. 5A and 5B are conceptual diagrams of messaging between a client application and cloud server for reducing load.
Figure 5B:
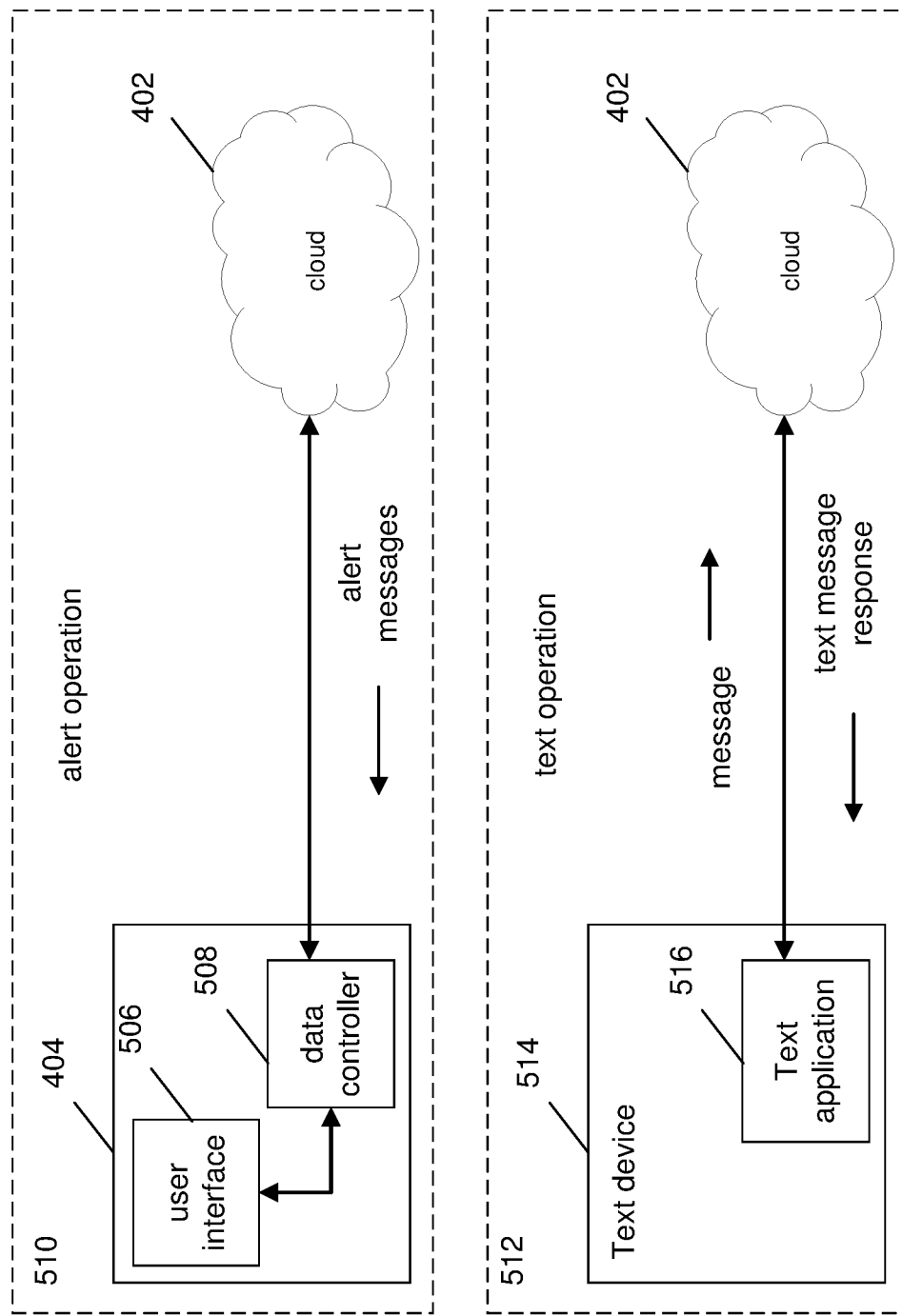

FIGS. 5A and 5B are conceptual diagrams of messaging between a client application and cloud server for reducing load. FIG. 5A depicts normal operation 502 and hold status operation 504 for cloud 402 and a client application 404. Client application 404 depicted in FIG. 5A includes user interface 506 and data controller 508.

During normal operation 502, a member can interact with user interface 506 and, based on the interactions, data controller 508 can issue requests for account data to cloud 402. Cloud 402 can retrieve the requested account data and provide a data response to data controller 508. The data displayed by user interface 506 can be the data retrieved from cloud 402. During hold status operation 504, a member can interact with user interface 506 and, based on the interactions, data controller 508 can provide local data for display on user interface 506. Cloud 402 can transmit update messages to update the locally stored data at data controller 508. In various implementations, the hold status operation 504 can all operation of the system or only when a determined level of load is on the network and/or devices of cloud 402.

The update messages transmitted from cloud 402 to data controller 508 can be based on monitored member account data at cloud 402. Transactions can post to the member account (e.g., bank account) and the transactions/changes caused by the transactions can be monitored and compared to defined update parameters. An example update parameter definition includes: delta balance greater than $1,000. In this example, when a transaction (or multiple transactions) changes the member account balance by more than $1,000, an update message containing the change data (e.g., posted transactions) can be sent from cloud 402 to data controller 508.

In another example, an update parameter definition includes: entity is "XYZ Corp". In this example, when a transaction entity is "XYZ Corp", an update message containing the change data (e.g., posted transactions) can be sent from cloud 402 to data controller 508. Another example update parameter definition includes: delta balance greater than $1,000 AND time of day between 9:00 am-12:00 am. In this example, when a transaction (or multiple transactions) changes the member account balance by more than $1,000 and the time of day is between 9:00 am and 12:00 am, an update message containing the change data (e.g., posted transactions) can be sent from cloud 402 to data controller 508. When the time of day is not between 9:00 am and 12:00 am, the update message can be delayed and/or queued. For example, when a transaction that changes the member account balance by over $1,000 posts at 1:00 am, the update message can be sent anytime before the 9:00 am active time period. In this example, account monitoring and the generation/transmission of update messages can spread out over the inactive time period. Some transactions, such as direct deposit transactions, can post at times that members are not usually active (e.g., during late night or early morning hours). Implementations can reduce account monitoring and/or reduce the rate of transmission for update messages during these inactive time periods (e.g., at times not between 9:00 am and 12:00 am) such that the computing load can be spread out to more effectively utilize resources.

Update messages can also be transmitted from cloud 402 to data controller 508 based on predictions by machine learning models. For example, based on features for the posted transaction(s) (e.g., time of day, type of transaction, entity, delta to balance, etc.), a trained/configured machine learning model can predict a member access activity. When the machine learning model predicts that the member access activity is likely (e.g., a prediction with a confidence above a criteria) an update that contains the posted transaction(s) (e.g., a change caused by the posted transaction(s)) can be transmitted from cloud 402 to data controller 508. When the member requests to view the account data, locally stored data from data controller 508 can be displayed by user interface 506.

FIG. 5B depicts alert operation 510 and text operation 512. Client application 404 depicted in alert operation 512 includes user interface 506 and data controller 508. Text device 514 depicted in text operation 512 includes text application 516.

In alert operation 510, cloud 402 can transmit alert message(s) to data controller 508. Member account(s) can be monitored at cloud 402, and detected changes can be compared to alert preferences stored for the member account. Alert preference definitions can be similar to update parameter definitions. An example alert preference definition includes: delta balance greater than $1,000. In this example, when a transaction (or multiple transactions) changes the member account balance by more than $1,000, an alert message containing the posted transaction(s) can be sent from cloud 402 to data controller 508.

In another example, an alert preference definition includes: entity is "ABC Inc.". In this example, when a transaction entity is "ABC Inc.," an update message containing the posted transaction can be sent from cloud 402 to data controller 508. Another example alert preference definition includes: delta balance greater than $1,000 AND time of day between 9:00 am-10:00 pm. In this example, when a transaction (or multiple transactions) changes the member account balance by more than $1,000 and the time of day is between 9:00 am and 10:00 pm, an alert message containing the posted transaction(s) can be sent from cloud 402 to data controller 508. When the time of day is not between 9:00 am and 10:00 pm, the alert message can be delayed until the active time period. For example, when a transaction that changes the member account balance by over $1,000 posts at 1:00 am, the alert message can be sent at 9:00 am. In this example, account monitoring and the generation/transmission of alert messages can be scheduled for 9:00 am (e.g., the start of the active time period).

Alert messages can be displayed by user interface 506 of client application 404. In some implementations, the alert messages from cloud 502 are transmitted to a client device associated with the member account as a push message, text message, or other suitable message. The alert message can be displayed at the client device as part of the operating system running on the client device, as a text message, or in any other suitable manner. Implementations perform alert operation 510 when client application 404 and/or a client device associated with a member account is registered for alert messages. Alert preferences can be defined for the member account to configure the transmission of alert messages.

Alert messages can reduce the load on cloud 402 by reducing member logins and/or client application 404 data requests. For example, client application data requests and/ or member logins can involve overhead associated with authentication, security, and full application functionality (e.g., multi-factor authentication, building communication links/connections for full-scale application functionality, encryption, other security parameters, etc.). The alert preferences can be configured to alert members to the account information that is of interest to the member. Absent the alert message, the member may interact with client application 404 (or otherwise login) to view the information of interest. Because pushed alerts already informed the member of the information of interest, an application interaction and/or member login is not needed, and the overhead associated with these actions is reduced.

Text operation 512 includes a message from text device 514/text application 516 (e.g., a first text or other message) and text message responses from cloud 402. For example, cloud 402 can provide member account data in response to predetermined trigger messages. A message received from text device 514 (e.g., client device registered with a member account) and text application 516 (e.g., text application running on the client device) may include the content "#balance." The content can be compared to definitions for the predetermined trigger messages. In this example, "#balance" may be the trigger message for retrieving the member account's current balance. The account balance may be retrieved and cloud 402 may generate a text message reply with the account balance and transmit the reply to client device 514.

Another definition for a predetermined trigger message can include "#lastXtransactions", where X represents a number (e.g., between 1 and 10). In this example, cloud 402 may generate a text reply (or multiple text replies) with the details of the last X transactions. Another definition for a predetermined trigger message can include "#transactionsoverXYZ", where XYZ represents a numeric value (e.g., 1,000). In this example, cloud 402 may generate a text reply (or multiple text replies) with the details of transactions (e.g., transactions within the month, year, or other suitable date range) that cause a delta account balance change of at least the numeric value XYZ.

Implementations perform text operation 512 when a member account registers text device 514 for a text message service. The text replies can reduce the load on cloud 402 by eliminating portions of the workflow caused by client applications and member logins. For example, client applications and/or member logins can involve overhead associated with authentication, security, and full application functionality (e.g., multi-factor authentication, building communication links/connections for full-scale application functionality, encryption, other security parameters, etc.) Text service implementations can rely on the previous registration (e.g., members registering their text device) to ensure the communication is transmitted to the proper device. Moreover, some implementations provide access to limited data through the text message service, and thus a full-scale authentication may not be necessary. When a member is simply interested in viewing the latest account balance, a full member login using an application may be inefficient. The text message service can provide the member the desired member account information without spending the resource overhead associated with an application login.

Those skilled in the art will appreciate that the components illustrated in FIGS. 1-4, 5A, and 5B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
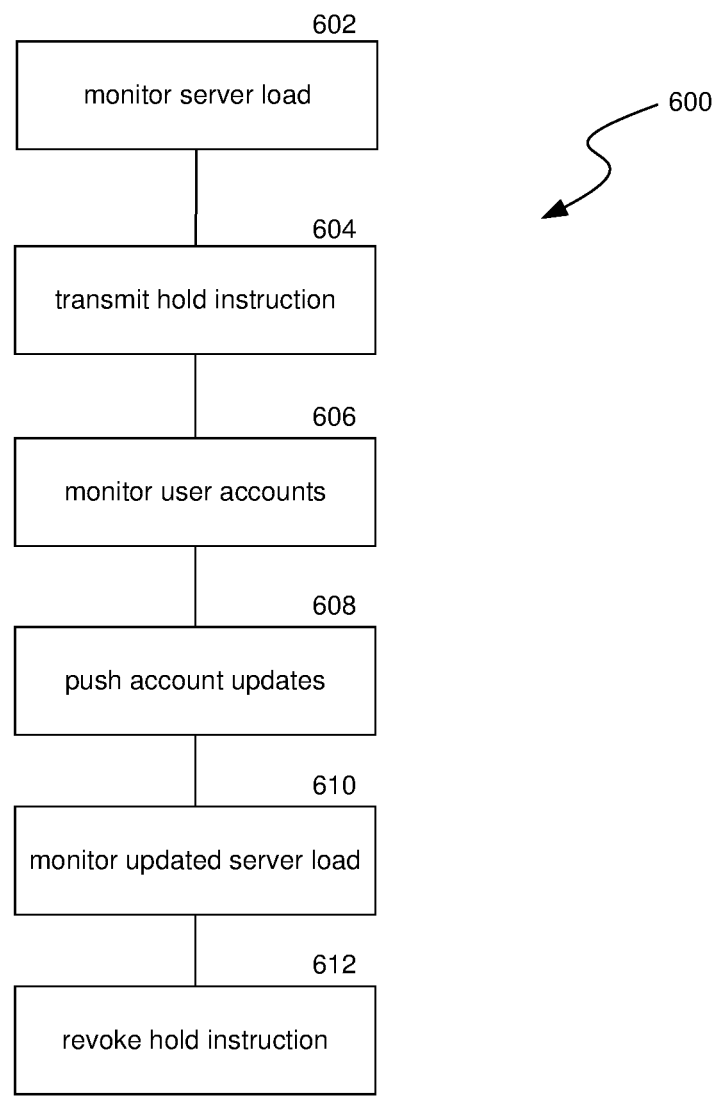
FIG. 6 is a flow diagram illustrating a process used in some implementations for reducing server load with selective messaging.

FIG. 6 is a flow diagram illustrating a process 600 used in some implementations for reducing server load with selective messaging. In some implementations, process 600 can be performed during cloud server operation, for example while cloud server(s) service client application requests for account data. In some implementations, process 600 can be performed in combination with process 700 of FIG. 7 and process 800 of FIG. 8. Process 900 of FIG. 9 can recommend parameters that configure process 600.

At block 602, process 600 monitors a load on cloud servers. For example, the monitored load can be a utilization metric, such as processor utilization, memory utilization, or any other suitable utilization or capacity metric. In another example, the monitored load can be a bandwidth utilization. The load can be monitored for a set of cloud computing devices (e.g., cloud servers, databases, routing devices, load balances, etc.) The monitored load can be compared to a load criteria, such as a utilization criteria (e.g., threshold), traffic criteria (e.g., threshold), or any other suitable criteria.

At block 604, process 600 transmits, to a member's client application when the monitored load meets a load criteria, a hold status for outbound requests. For example, the hold status can be a message that instructs client applications to pause outbound requests (e.g., data requests or access requests) to the cloud servers. In some implementations, the hold status message can include an expiration time and/or the client applications may be configured to implement a hold for a predetermined duration of time upon reception of a hold status message. In some implementations, instead of managing a hold status, the clients are configured to always use locally stored data to respond to user requests, updated as described below.

At block 606, process 600 monitors changes to the member's account. For example, the member account can be a bank account (e.g., checking, saving, investment, and the like) with a balance such that posted transactions change the balance value over time. The member's account can be monitored for posted transactions, changes to account balances, changes to settings, preferences, and other member data, and other changes. In some implementations, the monitored transactions include transaction details, such as transaction entity, transaction type, transaction category, change to account balance, and other suitable transaction details. Changes for a member account can be detected based on the monitoring.

At block 608, process 600 pushes account updates to the member's client application. For example, account updates can be triggered by defined update parameters. The update parameters can define that an account update is triggered by one or more of: a) a change in account balance above a threshold; b) a predetermined period of time since a last account update; c) an account transaction comprising an entity that matches a predetermined entity identifier; or d) a combination thereof.

In some implementations, the member's client application is configured to store the pushed account updates locally and display member account data from the locally stored account updates. For example, a member interacting with the client application may select a user interface element that displays the member account balance. During the hold status, the displayed member account balance may be the account balance according to the locally stored account updates at the client application. Thus, during the hold status, outbound requests for the account balance may be paused, and the displayed account balance can be the account balance stored locally.

At block 610, process 600 monitors an updated load on cloud servers. For example, the monitored load (e.g., utilization metric, capacity metric, traffic metric, etc.) can be updated at a point in time after transmission of the hold status. At block 612, process 600 transmits, to the member's client application when the updated load fails to meet the load criteria, a revocation of the hold status. For example, the client application can be configured to end the pause on outbound requests upon receiving a message that revokes the hold status.

In some implementations, the hold status transmitted to client applications may include an expiration time and can expire without a revocation message. For example, the hold status message can include an expiration time and the user's client application can be configured to pause outbound requests for account access/data until the expiration time. After expiration or revocation of the hold status, the user's client application can be configured to resume outbound requests to the cloud servers for account access/data.

Figure 7:
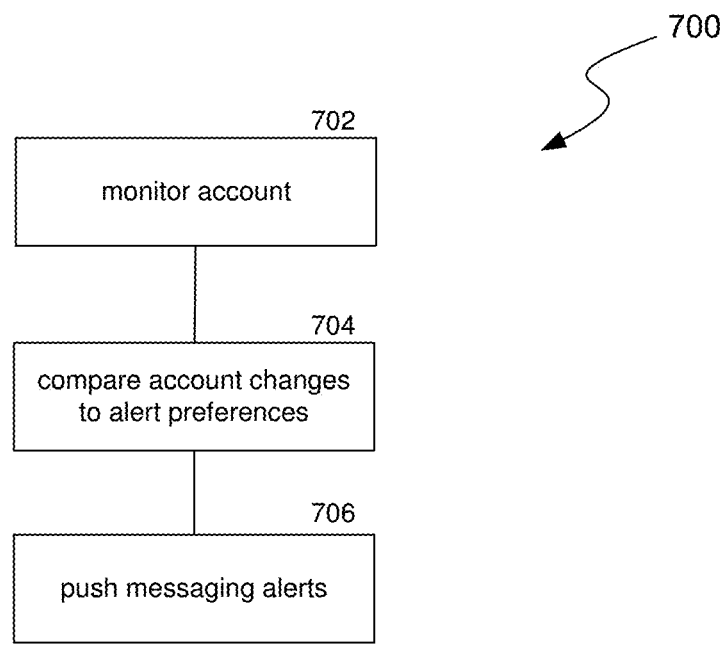
FIG. 7 is a flow diagram illustrating a process used in some implementations for pushing message alerts to client applications.

FIG. 7 is a flow diagram illustrating a process 700 used in some implementations for pushing message alerts to client applications. In some implementations, process 700 can be performed during cloud server operation, for example while cloud server(s) service client application requests for account data. In some implementations, process 700 can be performed in combination with process 600 of FIG. 6 and process 800 of FIG. 8. Process 900 of FIG. 9 can recommend preferences that configure process 700.

At block 702, process 700 monitors changes to the member's account. For example, the member account can be a bank account (e.g., checking, saving, investment, and the like) with a balance such that posted transactions change the balance value over time. The member's account can be monitored for posted transactions, changes to account balances, changes to settings, preferences, and other member data, and other changes. In some implementations, the monitored transactions include transaction details, such as transaction entity, transaction type, transaction category, change to account balance, and other suitable transaction details. Changes for a member account can be detected based on the monitoring.

At block 704, process 700 compares monitored account changes to alert preferences for the member account. Example alert preference definitions include a change in account balance above a threshold, an account transaction comprising an entity that matches a predetermined entity identifier, or a combination thereof. At block 706, process 700 transmits alerts when monitored account changes meet the alert preferences. For example, when a posted transaction causes a delta change to a member's account balance that exceeds the threshold, an alert message can be pushed to the client application. In another example, when a posted transaction includes an entity that matches the predetermined entity identifier, an alert message can be pushed to the client application. The client application can be configured to display the alert message at the member's device.

In some implementations, the alert messages can be transmitted to a member device associated with the member account as a push message, text message, or other suitable message. The alert message can be displayed at the member device as part of the operating system running on the device, as a text message, or in any other suitable manner.

Figure 8:
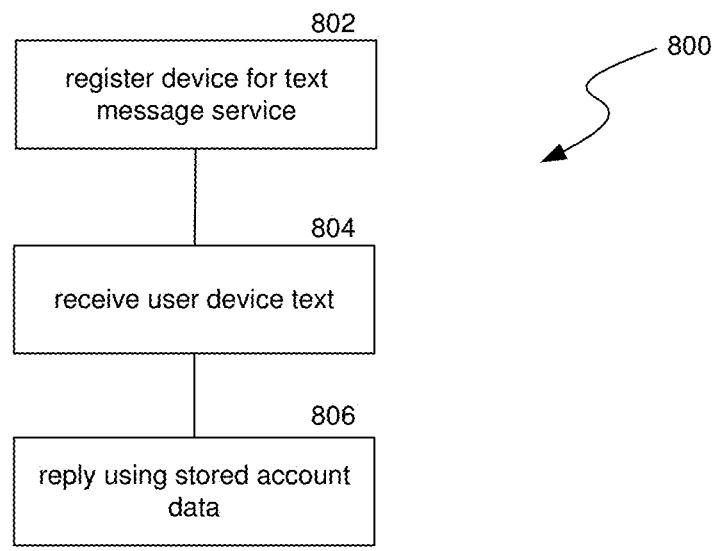
FIG. 8 is a flow diagram illustrating a process used in some implementations for text message service for member accounts.

FIG. 8 is a flow diagram illustrating a process 800 used in some implementations for text message service for user accounts. In some implementations, process 800 can be performed during cloud server operation, for example while cloud server(s) service client application requests for account data. In some implementations, process 800 can be performed in combination with process 600 of FIG. 6 and process 700 of FIG. 7. Process 900 of FIG. 9 can recommend member device registration that relates to process 800.

At block 802, process 800 registers a member account for a text message service. For example, a member client application/member device can be registered for the text message service. Registration may include an authentication flow, such as two-factor authentication, three-factor authentication, username and password confirmation, authentication using one or more authentication devices (e.g., located at an automated teller machine associated with the member organization), or any other suitable authentication. In some implementations, the member device is a mobile device and registering the mobile device includes registering a phone number.

At block 804, process 800 receives a message from a client device registered to a member account. For example, the message can be a text message, which can be analyzed to identify the originating phone number, and the originating phone number can be matched to a member device registered with the text message service. In another example, the message can be originated by the user from an app or website, with a command to issue a text message response with particular account data.

At block 806, process 800 generates and transmits a reply to the received message. For example, cloud server(s) can provide member account data in response to predetermined trigger messages. A text message received from the member device may include the content "#balance". The content can be compared to definitions for the predetermined trigger messages. In this example, "#balance" may be the trigger message for retrieving the member account's current balance. The account balance may be retrieved and the cloud server(s) may generate a text message reply with the account balance and transmit the reply to the member device.

Figure 9:
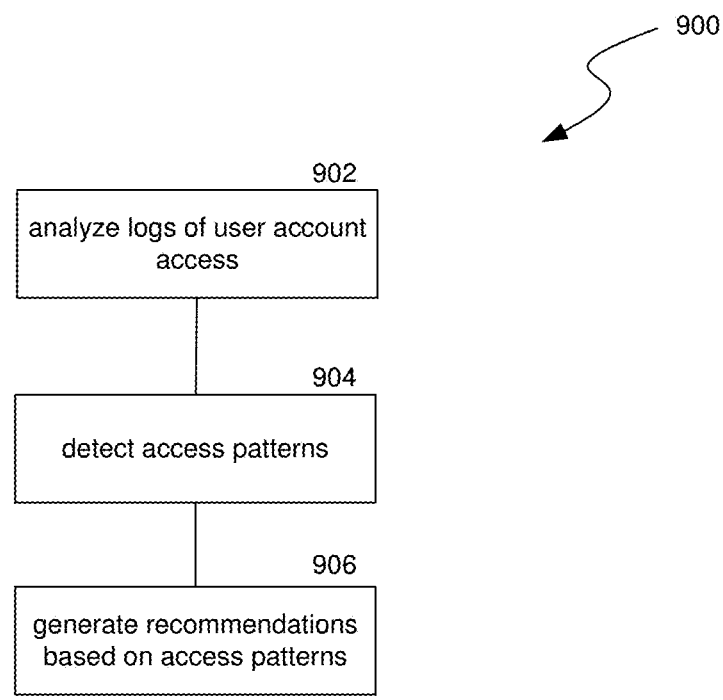
FIG. 9 is a flow diagram illustrating a process used in some implementations for analyzing member account access to perform messaging.

FIG. 9 is a flow diagram illustrating a process 900 used in some implementations for analyzing user account access to perform messaging. In some implementations, process 900 can be performed during cloud server operation, for example while cloud server(s) service client application requests for account data. In some implementations, process 900 can be make recommendations for parameters that relates to process 600 of FIG. 6, preferences that relates to process 700 of FIG. 7, and registrations that relates to process 800 of FIG. 8.

At block 902, process 900 analyzes log data of user account access. For example, machine learning model(s) can be configured to digest log data that represents a member's actions when accessing a member account. The log data can include online and/or client application login data, navigation data, viewing data, viewed/accessed transactions data (e.g., transaction type, transaction entity, change in account balance, etc.), and any other suitable log data. The log entries for this data can also include context, such as a timestamp (e.g., time and date), identifier for computing device/system processing the client requests, and other suitable context. In some implementations, machine learning model(s) are configured to analyze log data in combination with transactions data for a member's account.

At block 904, process 900 detects access patterns from the analyzed log data. For example, the output from the analysis of the log data (e.g., by machine learning model(s)) can be associations between one or more posted transactions and member account access/activity. At block 906, process 900 recommends update parameters, alert preferences, and/or text message service based on the detected access patterns. For example, trends that associate posted transactions to member account access/activity can be detected, and update parameters, alert preferences, and/or a text service registration recommendations can be generated based on these trends.

In some implementations, a trend that indicates member account activity (e.g., frequency member activity) proximate to a recurring account transaction (e.g., direct deposit of paycheck) can indicate the member's interest in the paycheck deposit status. In this example, a recommendation can be generated that recommends an update parameter and/or alert preference definition that meets the characteristics of the direct deposit transaction (e.g., transaction type, transaction among, entity performing the transaction, date or date range, and the like). In another example, a member may have less consistent transactions that change the account balance, however trends in the access log data can indicate member account activity (e.g., frequency member activity) proximate to any transaction that causes an account balance change over a threshold. In this example, a recommendation can be generated that recommends an update parameter and/or alert preference definition that meets the characteristics of these transactions (e.g., transaction type, transaction delta amount, and the like).

Implementations can present recommended update parameters, alert preferences, and/or text message services to the member, for example using a client application. An accepted recommendation can alter the update parameters used to trigger account updates during a hold status, the alert preferences used to trigger alert messages, and/or a text message service registration status for a member account. In this example, the accepted recommendation can alter the parameters and/or preferences used to push/transmit messages from a cloud server to a client application/client device.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for reducing server load by pushing data to client applications, the method comprising:
   monitoring a load on one or more cloud systems;
   transmitting, to a client application in response to the monitored load meeting a load criteria, a hold status for outbound requests, wherein the hold status comprises an expiration time;
   monitoring changes to a user's account, wherein at least a portion of the changes are caused by account transactions; and
   pushing, while the hold status is unexpired, account updates to the client application based on defined update parameters, wherein:
      the update parameters define that an account update is triggered by one or more of: a) a change in account balance above a threshold; b) a predetermined period of time since a last account update; c) an account transaction comprising an entity that matches a predetermined entity identifier; or d) a combination thereof;
   the client application is configured to store the pushed account updates locally, and
   the client application is configured to display user account data from the locally stored account updates in response to a user command.

2. The method of claim 1, wherein the monitored load on the one or more cloud systems comprises processor utilization for cloud server devices that process client application requests to access user accounts.

3. The method of claim 1, wherein:
   the client application pauses outbound requests for account data until the expiration time, and
   after the expiration time, the client application is configured to resume outbound requests to the cloud systems for account data.

4. The method of claim 1, further comprising:
   detecting access patterns for the user's account; and
   recommending update parameters for the user's account based on the detected access patterns.

5. The method of claim 4, wherein the access patterns are detected by a machine learning model that analyzes historic log data representative of activity for the user's account.

6. The method of claim 1, further comprising:
   pushing, while the hold status is unexpired, account updates to the client application based on predictions generated by a machine learning model, wherein,
      the machine learning model receives one or more account transactions as input and predicts a likelihood of user account access as output, and
      one or more account updates are triggered when the predicted output generated by the machine learning model meets a confidence criteria.

7. The method of claim 6, wherein the machine learning model is trained using historic log data representative of user account actions and historic transaction data for the user's account.

8. The method of claim 1, wherein:
   the update parameters define an active time period for account updates, and
   when an account update is triggered outside the active time period, the account update is delayed by a period of time and the account update is transmitted at least by a start of the active time period.

9. The method of claim 8, wherein the active time period is defined by a start time comprising a first time of day and an end time comprising a second time of day.

10. A computer-readable storage medium storing instructions that, when executed by a computing system, cause the computing system to perform a process to reduce server load by pushing data to client applications, the process comprising:
   monitoring a load on one or more cloud systems;
   transmitting, to a client application in response to the monitored load meeting a load criteria, a hold status for outbound requests, wherein the hold status comprises an expiration time;
   monitoring changes to a user's account, wherein at least a portion of the changes are caused by account transactions; and
   pushing, while the hold status is unexpired, account updates to the client application based on defined update parameters, wherein:
      the update parameters define that an account update is triggered by one or more of: a) a change in account balance above a threshold; b) a predetermined period of time since a last account update; c) an account transaction comprising an entity that matches a predetermined entity identifier; or d) a combination thereof;

the client application is configured to store the pushed account updates locally, and the client application is configured to display user account data from the locally stored account updates in response to a user command.

11. The computer-readable storage medium of claim 10, wherein the monitored load on the one or more cloud systems comprises processor utilization for cloud server devices that process client application requests to access user accounts.

12. The computer-readable storage medium of claim 10, wherein:

the client application pauses outbound requests for account data until the expiration time, and after the expiration time, the client application is configured to resume outbound requests to the cloud systems for account data.

13. The computer-readable storage medium of claim 10, wherein the process further comprises:

detecting access patterns for the user's account; and recommending update parameters for the user's account based on the detected access patterns.

14. The computer-readable storage medium of claim 13, wherein the access patterns are detected by a machine learning model that analyzes historic log data representative of activity for the user's account.

15. The computer-readable storage medium of claim 10, wherein the process further comprises:

pushing, while the hold status is unexpired, account updates to the client application based on predictions generated by a machine learning model, wherein, the machine learning model receives one or more account transactions as input and predicts a likelihood of user account access as output, and one or more account updates are triggered when the predicted output generated by the machine learning model meets a confidence criteria.

16. The computer-readable storage medium of claim 15, wherein the machine learning model is trained using historic log data representative of user account actions and historic transaction data for the user's account.

17. The computer-readable storage medium of claim 10, wherein:

the update parameters define an active time period for account updates, and when an account update is triggered outside the active time period, the account update is delayed by a period of time and the account update is transmitted at least by a start of the active time period.

18. The computer-readable storage medium of claim 17, wherein the active time period is defined by a start time comprising a first time of day and an end time comprising a second time of day.

19. A computing system for reducing server load by pushing data to client applications, the system comprising:

one or more processors; and one or more memories storing instructions that, when executed by the one or more processors, cause the computing system to perform a process comprising:

monitoring a load on one or more cloud systems;

transmitting, to a client application in response to the monitored load meeting a load criteria, a hold status for outbound requests, wherein the hold status comprises an expiration time;

monitoring changes to a user's account, wherein at least a portion of the changes are caused by account transactions; and pushing, while the hold status is unexpired, account updates to the client application based on defined update parameters, wherein:

the update parameters define that an account update is triggered by one or more of: a) a change in account balance above a threshold; b) a predetermined period of time since a last account update; c) an account transaction comprising an entity that matches a predetermined entity identifier; or d) a combination thereof;

the client application is configured to store the pushed account updates locally, and the client application is configured to display user account data from the locally stored account updates in response to a user command.

20. The system of claim 19, wherein the monitored load on the one or more cloud systems comprises processor utilization for cloud server devices that process client application requests to access user accounts.

* * * * *